T. J. De YAMPERT.
Plow.
No. 23,974
Patented May 10, 1859.
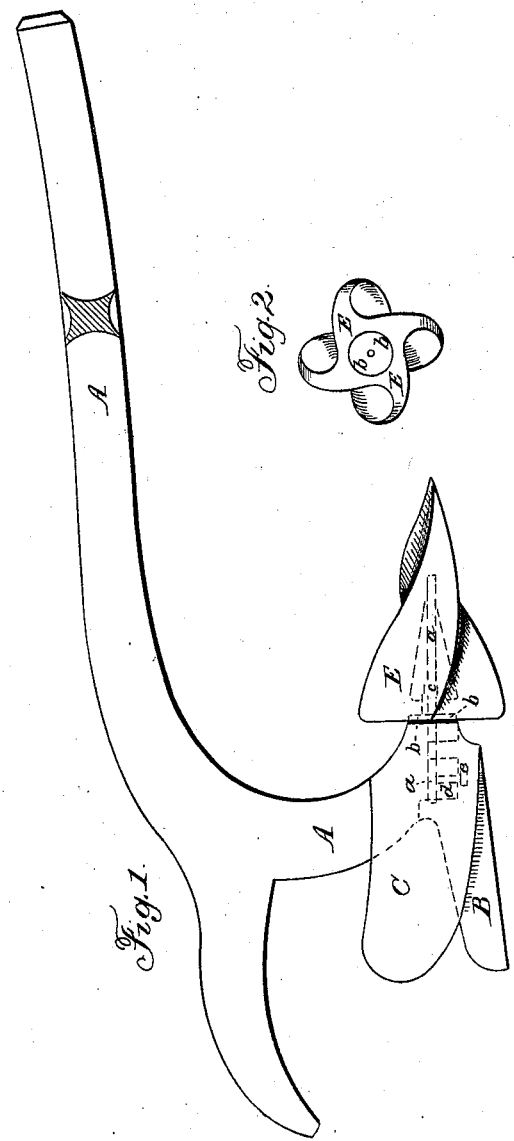
Witnesses
S. St. J. Gardner
E. Bross
Inventor
T. J. de Yampert

UNITED STATES PATENT OFFICE.

T. J. DE YAMPERT, OF SHOHOLA, PENNSYLVANIA.

IMPROVEMENT IN PLOWS.

Specification forming part of Letters Patent No. 23,974, dated May 10, 1859.

*To all whom it may concern:*

Be it known that I, T. J. DE YAMPERT, of Shohola, in the county of Pike and State of Pennsylvania, have invented a new and useful Plow; and I do hereby declare that the following is a full, clear, and exact description of the same, reference being had to the accompanying drawings, forming part of this specification, in which—

Figure 1 is a side view of my invention. Fig. 2 is an end view of the cone, showing the blades at the base.

This invention consists in a novel manner of constructing and operating a plow by using a spirally-revolving cone, as hereinafter fully shown and described, whereby the plow will run easily through stony ground without heaving out, and pulverize the soil more thoroughly.

To enable those skilled in the art to fully understand and construct my invention, I will proceed to describe it.

A represents the beam and frame, both being made in one piece; B, the landside, and C the mold-board. The whole is of metal, though the landside and mold-board may be of wood, if desired.

E is a cone, with three, four, or more cutting-blades spirally winding round from the base to the apex of the cone, fastened to the frame A by the shaft *a* in such a manner as to allow its revolving around it. The shaft *a* extends into the cone for about two-thirds of its whole length through a cap, *b*, which is fastened to the base of the cone, and in the other direction it passes into the frame, where it is held fast by the set-screw *e* in the hub *d*. Thus the shaft *a*, having a collar, *c*, will hold the cone firmly in its position, and yet allow it to revolve freely. The cone is made of cast-iron, and may be cast in two pieces, so as to easily replace the point of the cone by a new one, if worn out. The handles and helve are as usual.

From the above description it will be seen that when the plow is set for work and drawn forward a certain depth and distance into the ground the resistance of the soil will act upon the cutting blades or wings of the cone so as to cause its revolving continually while it passes through the ground, thus pulverizing and preparing the same far more than any other plow.

I am aware that rotating conical points or mold-boards have been made which have spiral undercut wings upon them; but from the fact that these wings have run one into the other, or their pitch changed, and thus break up the uniformity of the cone, they have to be driven by mechanism to turn them, as they are incapable from their very construction to turn by simple resistance. To such cones I lay no claim. Mine are made with a series of curved threads, wings, or flanges, undercut, but running from the base to the very apex of the cone, and only losing themselves in the point of the cone. This construction of a cone will allow it to turn by the simple friction of the earth upon it, and without any mechanism; and thus I avoid extra weight, gearing, and other expensive parts. In that class of bayonet-shaped points where the wings run straight from base to point, instead of spiral, though they are said to turn on their axes, they will not do so; but I lay no claim whatever to any such, and it is immaterial whether they turn or not, as they are of an entirely different construction from that which I claim, and I claim only that which I believe I invented and am entitled to.

Having thus described my invention, what I claim as new, and desire to secure by Letters Patent, is—

1. A revolving cone having undercut or overhanging curved flanges or wings that extend entirely from the base to the point of the cone, so that it will revolve upon its shaft or journal by the resistance of the earth alone against it, and without being driven by other forces, as herein described.

2. In combination with a cone furnished with spiral undercut flanges, and revolving by the resistance of the earth against it, the mold-board and landside for turning over the loosened earth and directing the plow in its path, substantially as described.

T. J. DE YAMPERT.

Witnesses:
S. ST. J. GARDNER,
C. E. BROSS.